G. W. WOODWARD.
AUTOMATIC CONTROL MECHANISM.
APPLICATION FILED FEB. 4, 1921.

1,428,199.

Patented Sept. 5, 1922.
10 SHEETS—SHEET 1.

Inventor
Garrett W. Woodward
By Dyrenforth, Lee, Chritton & Wiles
Attorneys

G. W. WOODWARD.
AUTOMATIC CONTROL MECHANISM.
APPLICATION FILED FEB. 4, 1921.

1,428,199.

Patented Sept. 5, 1922.
10 SHEETS—SHEET 8.

Fig. 11.

Witnesses

Inventor
Garrett W. Woodward
By Dyrenforth, Lee, Chritton + Wiles
Attorneys

G. W. WOODWARD.
AUTOMATIC CONTROL MECHANISM.
APPLICATION FILED FEB. 4, 1921.

1,428,199.

Patented Sept. 5, 1922.
10 SHEETS—SHEET 9.

Witnesses
Geo. L. Lawrence
Arthur C. Wright

Inventor
Garrett W. Woodward
By Dyrenforth, Lee, Chritton & Wiles
Attorneys.

Patented Sept. 5, 1922.

1,428,199

UNITED STATES PATENT OFFICE.

GARRETT W. WOODWARD, OF CHICAGO, ILLINOIS, ASSIGNOR TO WOODWARD AUTOMATIC CONTROL CORPORATION, OF CHICAGO, ILLINOIS, A CORPORATION OF ILLINOIS.

AUTOMATIC CONTROL MECHANISM.

Application filed February 4, 1921. Serial No. 442,424.

*To all whom it may concern:*

Be it known that I, GARRETT W. WOODWARD, a citizen of the United States, residing at 5056 Washington Blvd., Chicago, in the county of Cook and State of Illinois, have invented a new and useful Improvement in Automatic Control Mechanism, of which the following is a specification.

This invention relates to automatic control mechanism for automobiles and is fully described in the following specification and shown in the accompanying drawings in which:

Fig. 3 is an enlarged front elevation of the same with the cover removed;

I have illustrated an embodiment of my invention as applied to an ordinary form of chassis having a transmission 20 equipped to give three forward speeds and reverse, such as is usually operated by a lever and is known as an H-type transmission. This transmission has two gear shifting rods 21 and 22 extending through the transmission housing and slidable longitudinally therein. One of these rods, which we will designate 21, on its forward movement throws the gears into reverse and on its backward movement throws them into first or low speed. The other rod 22 likewise gives us second speed and high speed on the forward and backward movement respectively. Both are in the mid-position for neutral. The gear shifting mechanism which will now be described takes the place of the usual gear shifting lever.

Figure 14:
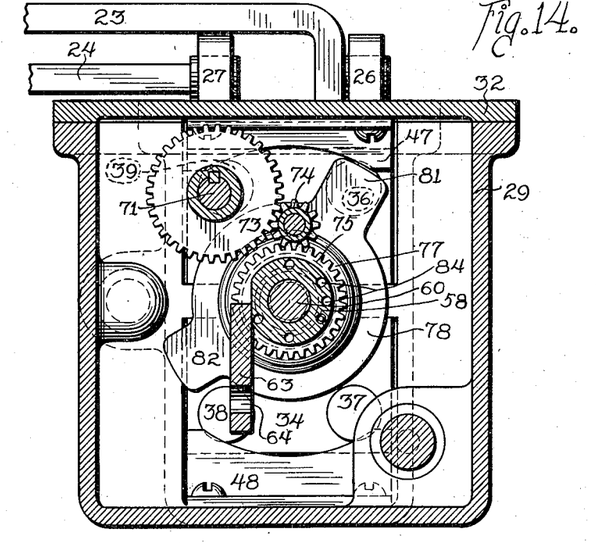
Figure 15:
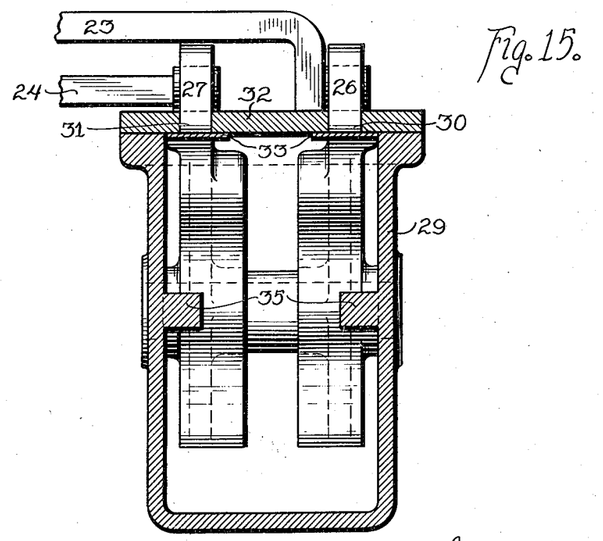

The rods 21 and 22 are hingedly connected to levers 23 and 24 respectively, which are pivotally mounted at 25 to the chassis frame. The opposite ends of the levers 23 and 24 are hingedly connected as shown in Figs. 14 and 15, to the upper ends of the rocker arms 26 and 27 respectively. These rocker arms are journalled upon the shaft 28 which is secured to the housing 29, the levers extending through longitudinal slots 30 and 31 in the cover 32. Plates 33 as shown in Fig. 15 act as sliding covers for these openings.

A block 34 has lateral grooves which are adapted to slide upon the guideways 35 which are formed upon the inner face of the housing. A series of four plungers 36, 37, 38 and 39 are mounted to slide longitudinally in this block and engage the rocker arms 26 and 27 upon opposite sides of the shaft 28. The plungers 36 and 37 engage the rocker arm 26 above and below the shaft 28 respectively while the plungers 38 and 39 engage the rocker arm 27 below and above the shaft 28 respectively.

Figure 9:
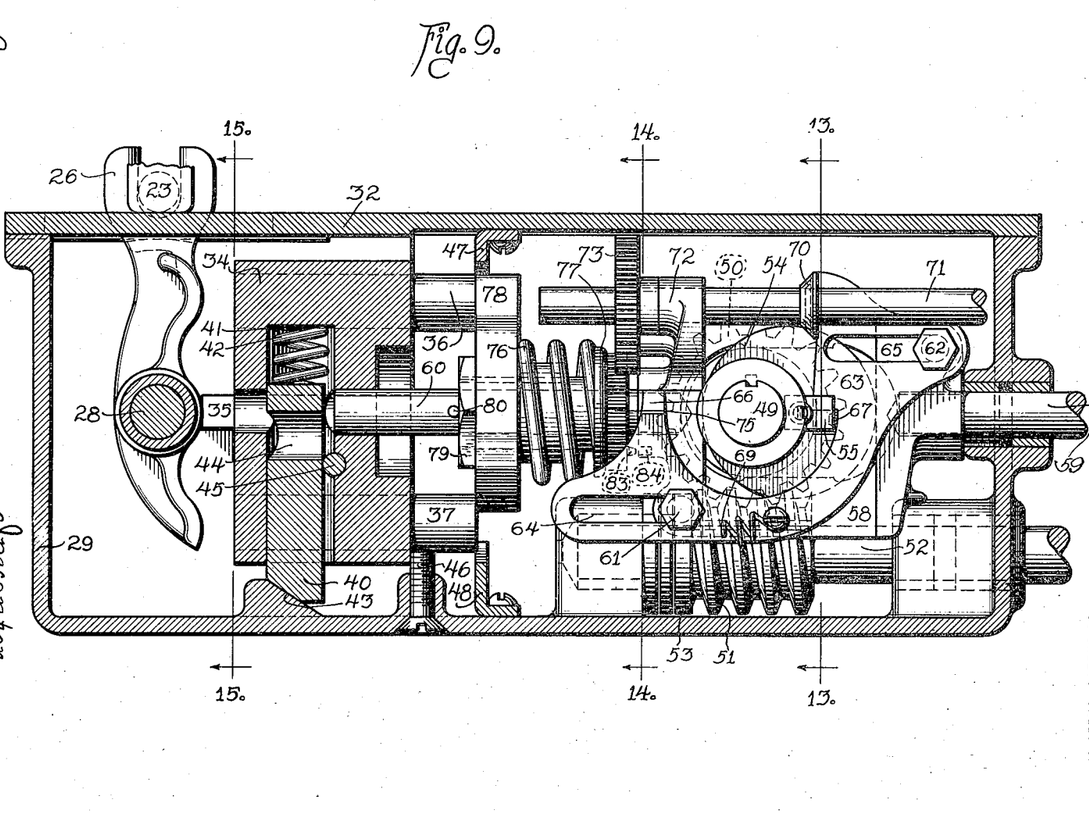
Fig. 9 is a vertical longitudinal section on the line 9—9 of Fig. 8.

A member 40 is slidably mounted in the vertical opening 41 in the block 34 and is pressed downwardly by means of the spring 42 against the cam surface 43 as shown in Fig. 9. This member has an opening 44 therethrough and is prevented from turning by means of a pin 45. The forward movement of the block 34 is limited by means of a screw 46 and the forward movement of the plungers is limited by the stops 47 and 48.

Figure 13:
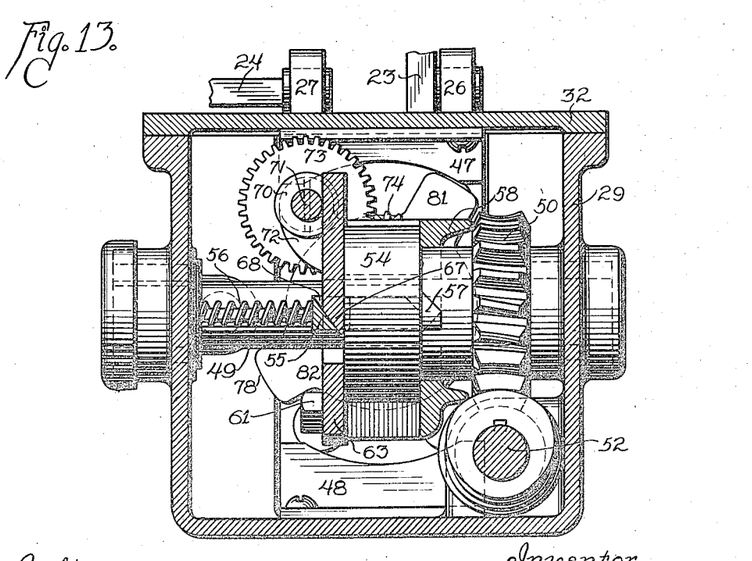
Figs. 13, 14 and 15 are transverse sections on the lines 13—13, 14—14 and 15—15 respectively of Fig. 9.

A cam shaft 49 is journalled transversely of the housing 29 and has a worm wheel 50 journalled thereon which meshes with a worm 51 which is driven by the shaft 52, which is journalled longitudinally of the housing and carries a thrust bearing 53 which takes the end thrust of the worm. A cam 54 is keyed to the shaft 49 and has a transverse opening therethrough as shown in Fig. 13 in which is slidably mounted a pawl 55 which is pressed inwardly by a spring 56 and adapted to engage notches 57 in the hub of the worm wheel 50.

A cam follower yoke 58 engages the opposite faces of the cam 54 and has guides 59 and 60 secured at opposite ends thereof and in alignment with each other. The guide 59 is slidably mounted in the housing 29 and the guide 60 is similarly mounted in the block 34, so that as the cam 54 is rotated the yoke 58 together with the guides 59 and 60 will be reciprocated in their mountings. The guide 59 is connected to the engine clutch (not shown) so that as this yoke begins its movement to the left, the clutch is disengaged. The yoke 58 has cap screws 61 and 62 secured thereto which serve as guides for the clutch operating member 63 which has slots 64 and 65 through which these cap screws pass. The member 63 has two chisel shaped projections 66 and 67 which are adapted to selectively engage the beveled recess 68 in the pawl 55 as shown in Fig. 13. The member 63 is normally held in the position shown in Fig. 9 by means of a spring 69 one end of which is attached to the member 63 and the other to the housing 29. The member 63 is drawn back against the action of the spring 69 by means of a collar 70 secured to the control shaft 71.

This shaft is slidably journalled in the bearing 72 and has a gear 73 slidably keyed thereon which meshes with a pinion 74 which in turn meshes with the gear 75, the latter being journalled upon the guide 60. The gear 75 is normally held in the position shown in Fig. 9 by means of a spring 76 which is compressed between the beveled washer 77 and the rotary selector 78. The selector 78 is slidably keyed upon the long hub of the gear 75 and is secured thereon by means of a nut 79. A pin 80 through the guide 60 serves as a stop for the end of the hub of the gear 75.

The rotary selector 78 has two fingers 81 and 82 which are adapted to selectively engage the plungers 36, 37, 38 and 39 as the selector is rotated, as shown in Fig. 14.

The method of operation of the mechanism thus far described is as follows:

The shaft 52 is continuously driven in any suitable manner such as by gearing from the crank shaft or other rotating part of the engine. By operating the control shaft 71, the construction and operation of which will later be explained, the gear 73 turns, the gears 74 and 75 thereby turning the rotary selector 78 to one of the positions in which one of the fingers 81 or 82 will be immediately in front of one of the plungers. Assume that it is in the position shown in Fig. 14 in which the finger 81 is in front of the plunger 36 which controls the mechanism for shifting the gears to first speed.

It will be observed that with the member 63 in the normal position as shown in Figs. 9 and 13, the beveled edge 67 holds the pawl 55 retracted so that the notches 57 in the hub of the worm wheel 50 will not be engaged thereby. Having set the selector 78 to the desired point, the control shaft 71 is then moved to the right as shown in Fig. 9 as will later be explained and the collar 70 engages the upper edge of the member 63, drawing it back so that the chisel shaped projections will move out from under the beveled edge 68 of the pawl 55 thereby permitting the spring 56 to move the pawl forward so that on the next quarter revolution of the worm wheel 50 it will engage one of the notches 57 of which there are four, and the cam 54, and pawl 55 will be carried around by the worm wheel 50.

Figure 10:
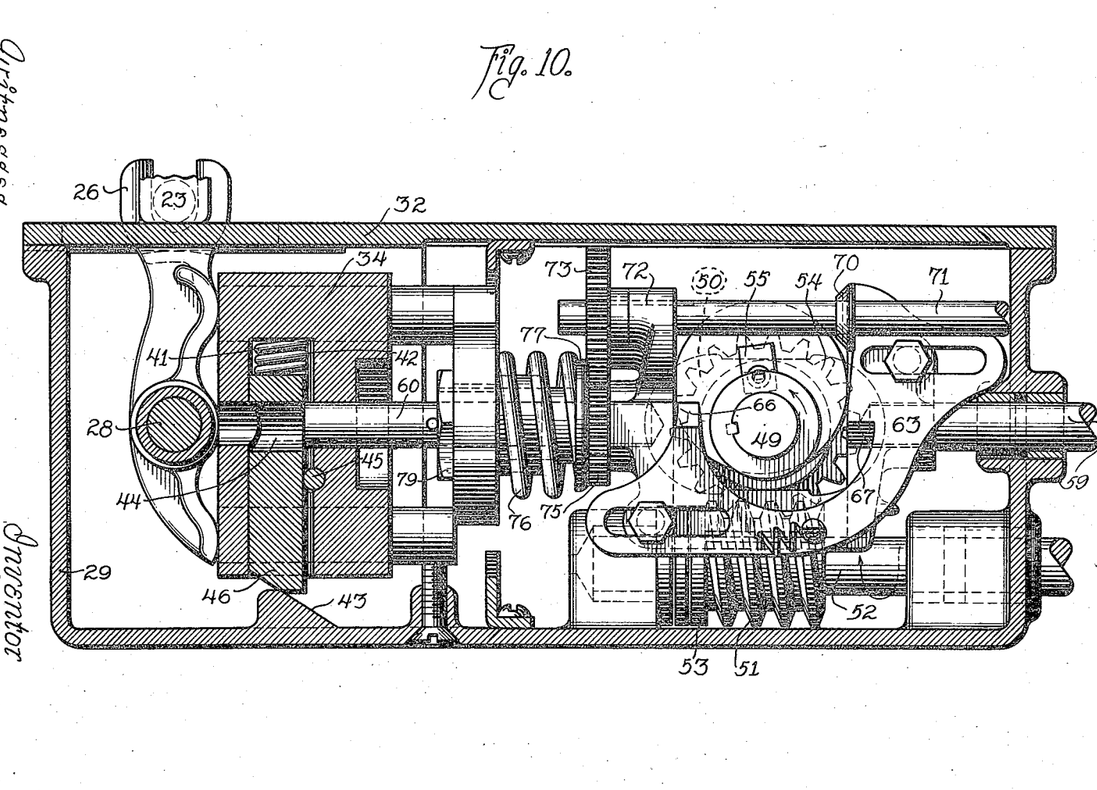
Figs. 10 and 11 are similar sections showing various positions of the shifting mechanism.
Figure 11:
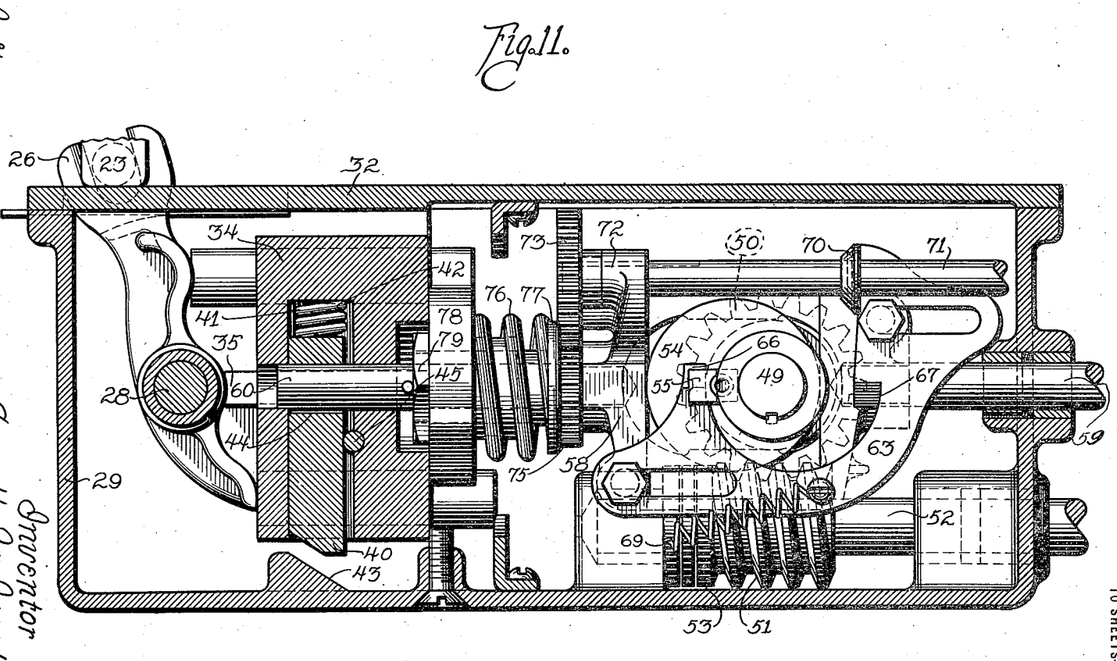
Figure 12:
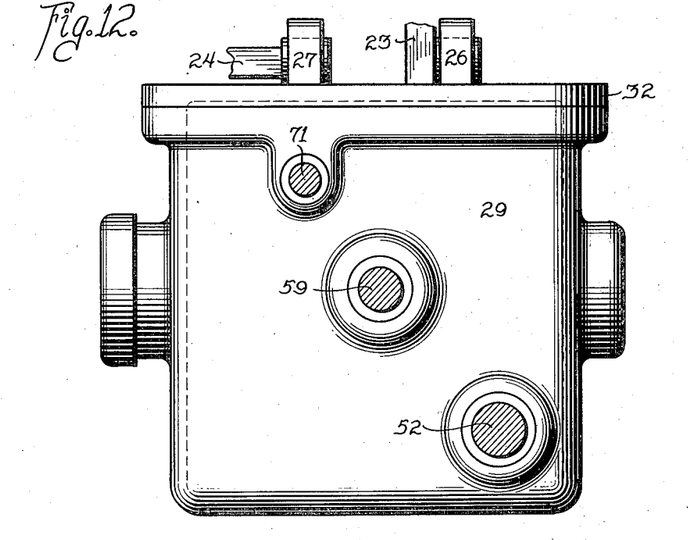
Fig. 12 is an end elevation of the gear shift housing.

As the cam rotates it moves the yoke 58 to the left as shown in Figs. 10 and 11, the view in Fig. 10 being a little over 90° from that in Fig. 11,—180° from its normal position. In Fig. 10, the selector 78 has moved one half its full travel and the yoke 58 must travel enough further to cover the distance between the yoke and the gear 75. As the parts move up to the position shown in Fig. 10 the end of the guide 60 bears against the member 40 moving it, together with the block 34, thus forcing the latter against the rocker arms 26 and 27, to the position shown in Fig. 10, thereby causing both of the rocker arms to be brought to the central or neutral position.

As soon, however, as the member 40 reaches the top of the cam 43 as it will at this point the opening 44 in the member 40 will come into alignment with the guide 60 and as this guide is therefore advanced by the movement of the yoke 58 and the cam 54, the guide 60 will pass on through the member 40 as shown in Fig. 11. At the same time the plunger 36 which is in front of the selector finger 81 will simultaneously be moved forward pushing the upper face of the rocker arm 26 forward as shown in Fig. 11. At the same time the lower end of the rocker arm 26 will slide the block 34 back upon the guide 60. The motion of the rocker arm 26 will be transmitted through the lever 23 to the rod 21 of the transmission mechanism thereby shifting the gears of the transmission to the first speed.

In order to insure that the selector 78 will turn to the proper positions I have provided a tapered dowel pin 83 upon the face of the gear 75 which is adapted to engage a series of holes 84 in the corresponding face of the yoke. The pin 83 will thus register with one of these openings in each operative position of the rotary selector.

As long as the control shaft 71 is held in the retracted position as shown in Figs. 10 and 11 the projection 66 will engage the beveled portions 68 of the pawl 55 thereby holding it retracted and the parts will remain in the positions shown in Fig. 11. As soon as the shaft 71 is released, however, the pawl 55 will engage the notch 57 as previously described and the cam 54 will be rotated through 180° to the position shown in Fig. 9 when the projection 67 will again cause the pawl 55 to be withdrawn and the parts will again stop in the position shown in Fig. 9 with the exception that the rocker arm 26 will remain in the position shown in Fig. 11.

It will be observed that if the gears of the transmission fail to mesh properly the spring 76 will yield so that no damage will be done and as soon as they have turned slightly they will be forced into engagement.

Figure 4:
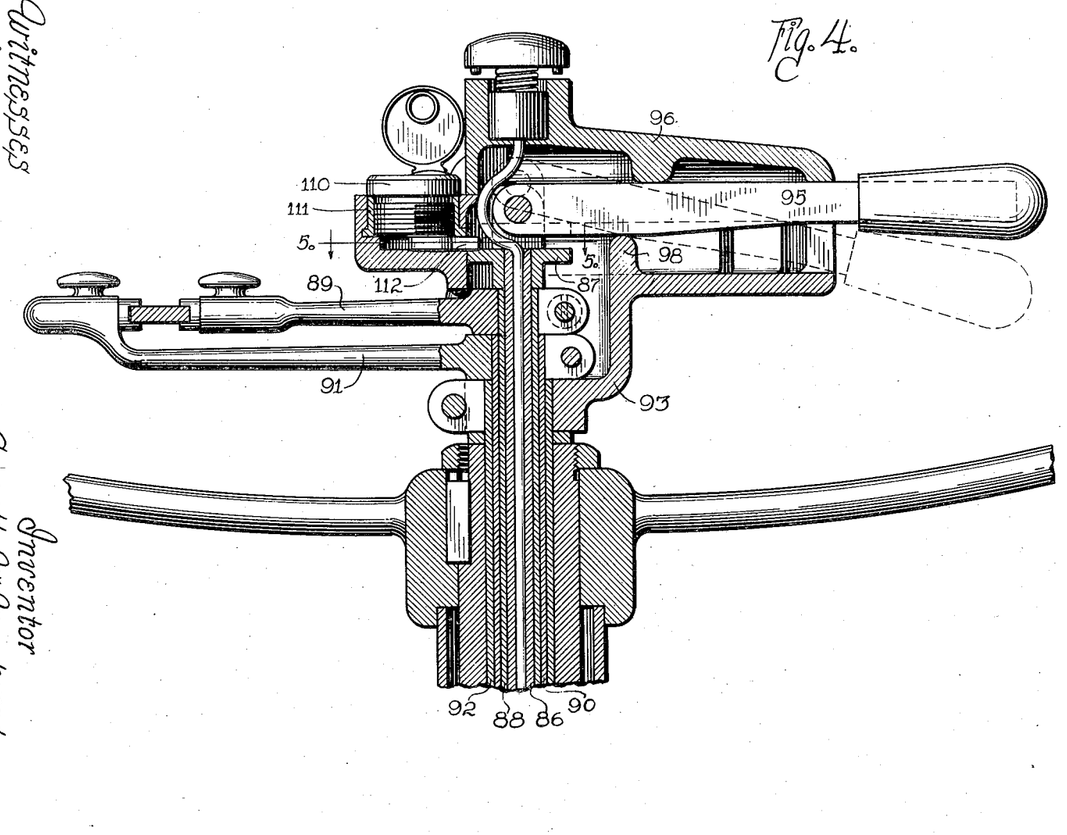
Fig. 4 is a longitudinal section on the line 4—4 of Fig. 3.

The control shaft 71 is connected with the steering wheel by means of a flexible shaft 85 which is preferably made by placing one tightly wound coil of wire within another, the two being reversely wound and placed under an initial tension so as to provide against slackness. This shaft is then placed in a suitable housing so that rotary or endwise movement of the opposite end of the flexible shaft will be transmitted to the control shaft 71. The other end of the control shaft is connected to the tube 86 which is preferably placed at the center of the steering column as shown in Fig. 4 and has a flanged button 87 at its upper end. This tube is journalled within the tube 88 to the upper end of which is secured a spark control lever 89. The tube 88 is likewise journalled in the tube 90 which is similarly connected to the throttle control lever 91 and is journalled in the fixed tube 92 which is secured at its upper end to the control box 93 and at its lower end to a fixed part of the automobile chassis.

The flanged button 87 carries two ears 94 between which is hingedly mounted a control lever which extends out through the side of the control box 93.

A cover 96 overlies the control box 93 and is secured thereto by means of screws 97. A circular ledge 98 is formed within the control box and is concentric with the tube 86. The lever 95 rests upon this ledge and is adapted to swing so as to overlie any of the notches 99, 100, 101, 102, 103, and 104, which correspond to the operative positions of the rotary selector 78 when it is set for the positions of brake, 3rd, 2nd, 1st, neutral and reverse, respectively. When the lever 95 is turned so as to overlie notch 102, the control shaft 71 is turned thereby so that the finger 81 will be immediately in front of the plunger 36 which is the first step in shifting the gears to the first forward speed.

With the shaft 52 driven by the engine, the lever 95 is then depressed as shown in dotted lines in Fig. 4, thereby raising the tube 86 and moving the control shaft to the right as shown in Fig. 10 thereby releasing the pawl 55 and causing the cam 54 to drive the yoke 58 to the left, disengaging the clutch. As the yoke 58 continues to move it causes the block 34 and the plunger 36 to be moved to the position shown in Fig. 11, whereby the gears will be shifted to first forward speed. As long as the lever 95 is held down the member 63 will cause the cam 54 and other operative parts to remain in the position shown in Fig. 11. If, however, the lever 95 is depressed and immediately raised the parts will execute the cycle of operations previously described and will not remain stationary in the position shown in Fig. 11 but will immediately return to the position shown in Fig. 9 except as previously noted that the rocker arms will remain in the shifted position.

Substantially the same cycle of operations is accomplished in shifting the gears to the second and third forward speeds and reverse except that one of the selector fingers 81 or 82 is brought in front of the plunger corresponding thereto, namely, 38, 39 and 37 respectively.

When the lever 95 is moved to neutral position, neither of the fingers 81 or 82 of the selector is in front of a plunger and consequently when the selector is moved forward by the cam the only effect is that the block 34 brings both of the rocker arms 26 and 27 to the neutral position as shown in Fig. 10.

Figures 1, 7:
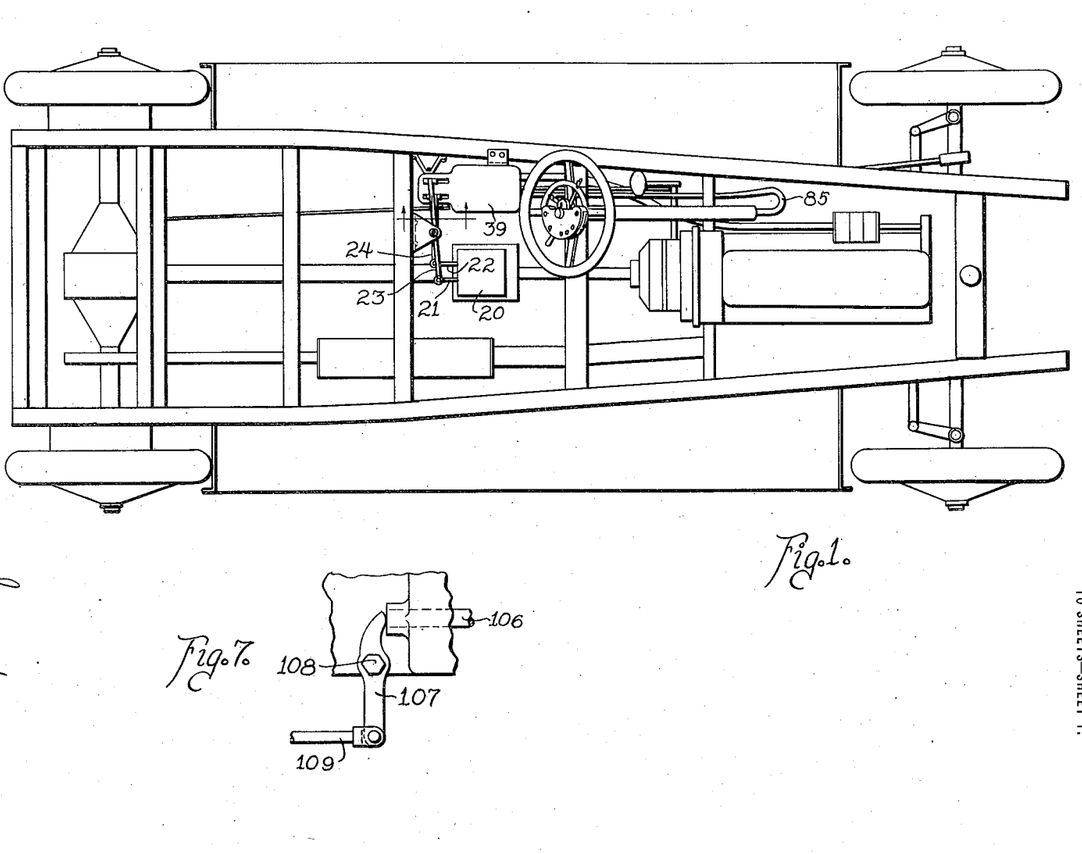
Figure 1 is a plan view of an automobile chassis with my invention applied thereto.
Fig. 7 is a partial side elevation of the brake connection.
Figure 2:
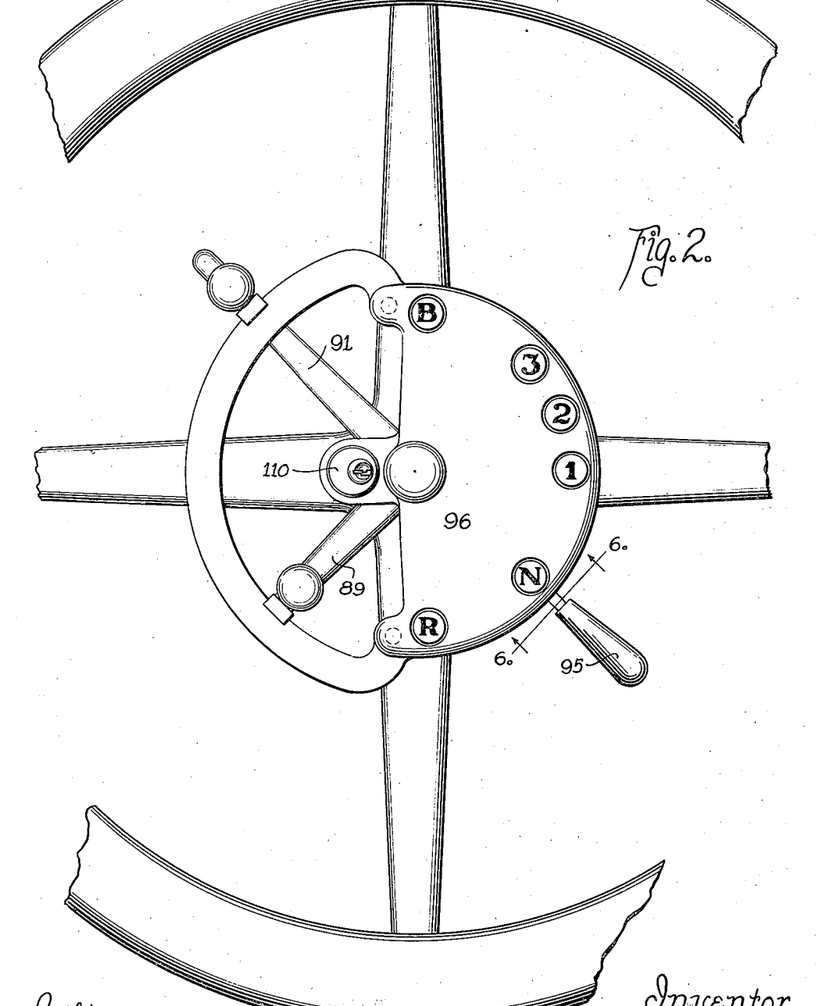
Fig. 2 is a front elevation of a steering wheel with a setting lever and quadrant mounted thereon.
Figure 8:
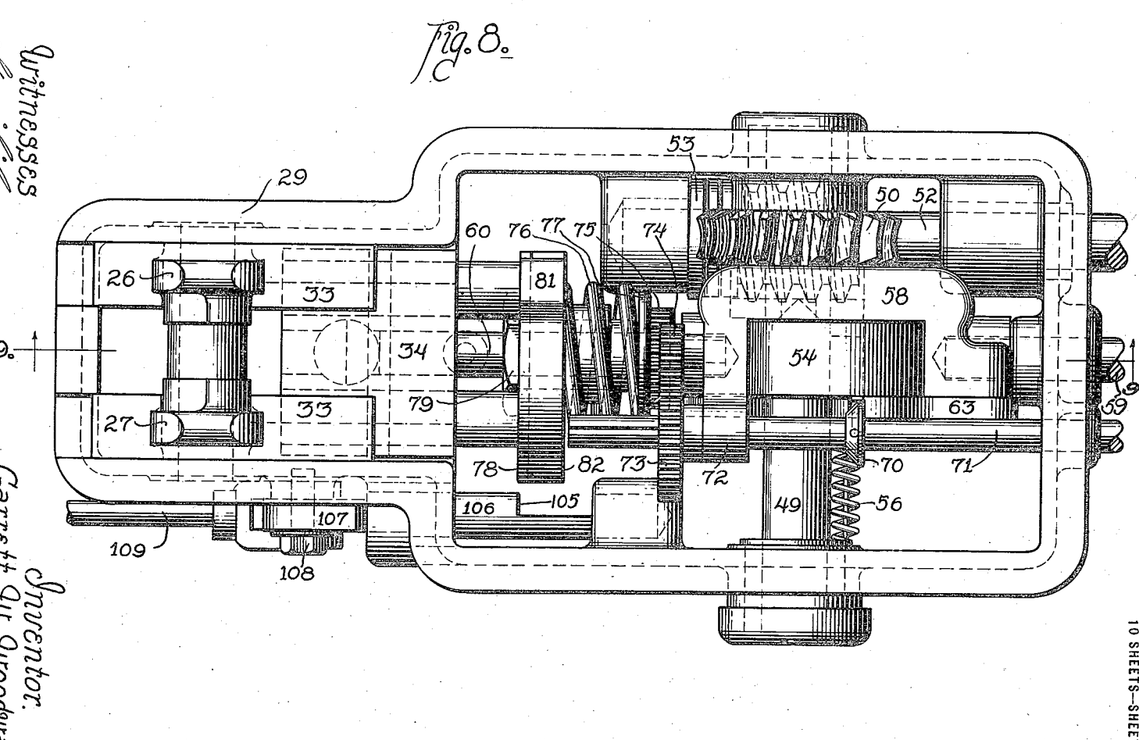
Fig. 8 is a top plan view of the gear shifting mechanism with the cover removed.

When the lever 95 is moved to the braking position under the letter B in Fig. 2 the selector finger 81 is moved so as to engage the shoulder 105 of the plunger 106 as shown in Figs. 7 and 8 which is slidably mounted in the housing 29. As this plunger is moved forward it moves the lever 107 which is fulcrumed on the pin 108 and to the lower end of which is hingedly connected a brake rod 109. This rod is operatively connected to the brake on the rear wheels in any well known manner so that as the brake rod is pulled the brakes will be set.

Figures 5, 6, 7:
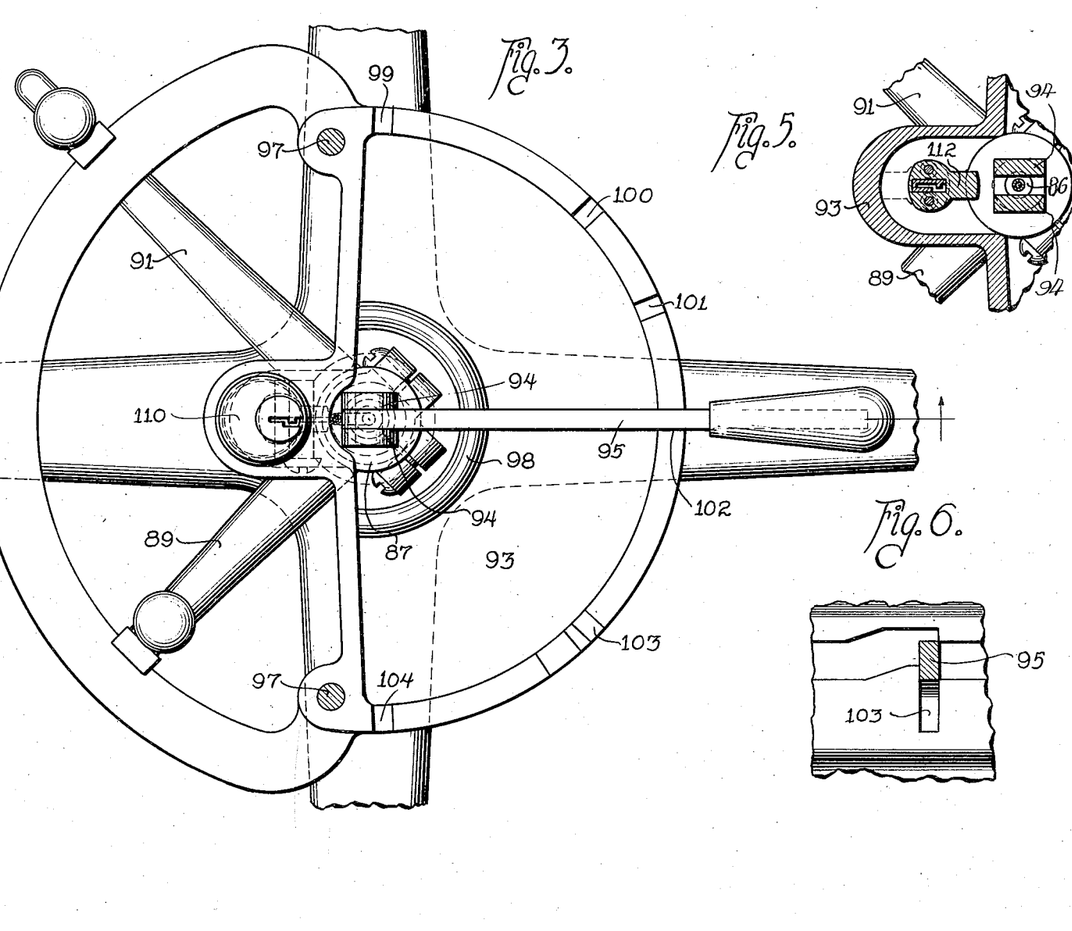
Fig. 5 is a partial transverse section on the line 5—5 of Fig. 4.
Fig. 6 is a partial elevation on the line 6—6 of Fig. 2.

A locking device is placed upon the control box which consists of a lock 110 which is preferably screwed into a hardened steel bushing 111, the latter being preferably cast in the control box. This lock has an eccentric arm 112 as shown in Figs. 4 and 5 which can be turned so as to overlie the flanged button 87 so that the lever 95 cannot be depressed to operate the gear shifting mechanism. When the flanged button 87 is raised, the eccentric arm can be turned so as to lie beneath the flanged button thereby permitting it to be locked in raised position. If this is done with the lever in the braking position, the brake will be set and locked.

It will also be observed that the lock cannot be removed from its hardened bushing 111 except the key is in place and the tumbler turned so as to turn the eccentric arm 112 to the dotted line position shown in Fig. 5.

While I have shown and described but a single embodiment of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim as new and desire to secure by Letters Patent is:

1. In a motor driven vehicle, a motor, a transmission having shiftable gears for providing a plurality of gear ratios, a clutch adapted to operatively connect said motor to said transmission, a member adapted to be operably connected to said motor, a series of plungers, each selectively movable to move said transmission gears into a predetermined gear ratio, a selector and means associated therewith operably connected to said member to selectively engage one of said plungers to move the transmission gears to one of said predetermined speeds and means operable by the motor for releasing said clutch before shifting said gears and for again engaging said clutch after said gears are shifted.

2. In a motor driven vehicle, a motor, a transmission having shiftable gears for providing a plurality of gear ratios, a clutch adapted to operatively connect said motor to said transmission, a member adapted to be operably connected to said motor, a series of plungers, each selectively movable to move said transmission gears into a predetermined gear ratio, a selector and means associated therewith operably connected to said member to selectively engage one of said plungers to move the transmission gears to one of said predetermined speeds and means operable by said member for releasing said clutch before shifting said gears and for again engaging said clutch after said gears are shifted.

3. In a motor driven vehicle, a motor, a transmission having shiftable gears for providing a plurality of gear ratios, a clutch adapted to operatively connect said motor to said transmission, a member adapted to be operably connected to said motor, a series of plungers, each selectively movable to move said transmission gears into a predetermined gear ratio, a selector and means associated therewith operably connected to said member to selectively engage one of said plungers to move the transmission gears to one of said predetermined speeds, means operable by the motor for releasing said clutch before shifting said gears and for again engaging said clutch after said gears are shifted, and control means for actuating said member.

4. In a motor driven vehicle, a motor, a transmission having shiftable gears for providing a plurality of gear ratios, a clutch adapted to operatively connect said motor to said transmission, a member adapted to be operably connected to said motor, a series of plungers, each selectively movable to move said transmission gears into a predetermined gear ratio, a selector and means associated therewith operably connected to said member to selectively engage one of said plungers to move the transmission gears to one of said predetermined speeds, means operable by the motor for releasing said clutch before shifting said gears and for again engaging said clutch after said gears are shifted, control means for setting said selector and control means for actuating said member.

5. In a motor driven vehicle, a motor, a transmission having shiftable gears for providing a plurality of gear ratios, a clutch adapted to operatively connect said motor to said transmission, a member adapted to be operably connected to said motor, a series of plungers, each selectively movable to move said transmission gears into a predetermined gear ratio, a selector and means associated therewith operably connected to said member to selectively engage one of said plungers to move the transmission gears to one of said predetermined speeds, means operable by the motor for releasing said clutch before shifting said gears and for again engaging said clutch after said gears are shifted, control means for setting said selector and control means for actuating said member, both of said control means being operable by a single element.

6. In a motor driven vehicle, a motor, a transmission having shiftable gears for providing a plurality of gear ratios, a clutch adapted to operatively connect said motor to said transmission, a member adapted to be operably connected to said motor, a series of plungers, each selectively movable to move said transmission gears into a predetermined gear ratio, a selector and means associated therewith operably connected to said member to selectively engage one of said plungers to move the transmission gears to one of said predetermined speeds, means operable by the motor for releasing said clutch before shifting said gears and for again engaging said clutch after said gears are shifted, control means for setting said selector, control means for actuating said member and a shaft common to both said means, rotatable to set said selector and movable longitudinally to cause the actuation of said member.

7. A gear shifting mechanism adapted to be applied to the shift rods of an H-type transmission having a clutch, said mechanism comprising a plurality of rocker arms, each operably connected to one of the shift rods of the transmission, a block movable to bring both of said rocker arms to the neutral position, plungers slidable in said block and movable to move said rocker arms to various operative positions, a selector for selectively actuating said plungers and means for moving said selector whereby one of the shift rods may be moved to an operative position.

8. A gear shifting mechanism adapted to be applied to the shift rods of an H-type transmission having a clutch, said mechanism comprising a plurality of rocker arms, each operably connected to one of the shift rods of the transmission, a block movable to bring both of said rocker arms to the neutral position, plungers movable to move said rocker arms to various operative positions, a selector for selectively actuating said plungers, means for moving said selector whereby one of the shift rods may be moved to an operative position, and a member operable by said last mentioned means for disengaging said clutch, holding it in disengaged position while the gear shift is made and again engaging said clutch after the gears shift is made.

9. A gear shifting mechanism adapted to be applied to the shift rods of an H-type transmission having a clutch, said mechanism comprising a plurality of rocker arms, each operably connected to one of the shift rods of the transmission, a block movable to bring both of said rocker arms to the neutral position, plungers slidably mounted in said block and movable to move said rocker arms to various operative positions, a selector for selectively actuating said plungers and means for moving said selector whereby one of the shift rods may be moved to an operative position.

10. A gear shifting mechanism adapted to be applied to the shift rods of an H-type transmission having a clutch, said mechanism comprising a plurality of rocker arms, each operably connected to one of the shift rods of the transmission, a block movable to bring both of said rocker arms to the neutral position, plungers movable to move said rocker arms to various operative positions, a rotary selector for selectively actuating said plungers and means for moving said selector whereby one of the shift rods may be moved to an operative position.

11. A gear shifting mechanism adapted to be applied to the shift rods of an H-type transmission having a clutch, said mechanism comprising a plurality of rocker arms, each operably connected to one of the shift rods of the transmission, a block movable to bring both of said rocker arms to the neutral position, plungers movable to move said rocker arms to various operative positions, a rotary selector for selectively actuating said plungers, and control means for moving said selector whereby one of the shift rods may be moved to an operative position.

12. A gear shifting mechanism adapted to be applied to the shift rods of an H-type transmission having a clutch, said mechanism comprising a plurality of rocker arms, each operably connected to one of the shift rods of the transmission, a block, a cam adapted to be intermittently driven, a cam follower having a guide adapted to move said block to bring both of said rocker arms to the neutral positions, means for releasing said guide from the block at the neutral position and means actuated by said cam follower on a further movement for selectively rocking one of said rocker arms to move the gears of the transmission to an operative position.

13. A gear shifting mechanism adapted to be applied to the shift rods of an H-type transmission having a clutch, said mechanism comprising a plurality of rocker arms, each operably connected to one of the shift rods of the transmission, a block, a cam adapted to be intermittently driven, a cam follower having a guide adapted to move said member to bring both of said rocker arms to the neutral positions, means for releasing said guide from the block at the neutral position, a series of plungers slidable in said block and a rotary selector actuated by said cam follower on a further movement for selectively moving one of said plungers for rocking one of said rocker arms to move the gears of the transmission to an operative position.

14. A gear shifting mechanism adapted to be applied to the shift rods of an H-type transmission having a clutch, said mechanism comprising a plurality of rocker arms, each operably connected to one of the shift rods of the transmission, a block movable to bring both of said rocker arms to the neutral position, plungers slidably mounted in said block and movable to move said rocker arms to various operative positions, a rotary selector for selectively actuating said plungers, and control means for moving said selector whereby one of the shift rods may be moved to an operative position.

15. A gear shifting mechanism adapted to be applied to the shift rods of an H-type transmission having a clutch, said mechanism comprising a plurality of rocker arms, each operably connected to one of the shift rods of the transmission, a block movable to bring both of said rocker arms to the neutral position, plungers slidably mounted in said block and movable to move said rocker arms to various operative positions, a rotary selector for selectively actuating said plungers, and control means on the steering column for moving said selector whereby one of the shift rods may be moved to an operative position.

16. A gear shifting mechanism adapted to be applied to the shift rods of an H-type transmission having a clutch, said mechanism comprising a plurality of rocker arms, each operably connected to one of the shift rods of the transmission, a block movable to bring both of said rocker arms to the neutral position, plungers slidably mounted in said block and movable to move said rocker arms to various operative positions, a rotary selector for selectively actuating said plungers, a lever on the steering column for turning said selector, a constantly rotating shaft, means for intermittently moving said blocks, a clutch for operatively connecting said means to said shaft and means operable by said lever for operating said last named clutch.

17. A gear shifting mechanism adapted to be applied to the shift rods of an H-type transmission having a clutch, said mechanism comprising a plurality of rocker arms, each operably connected to one of the shift rods of the transmission, a block movable to bring both of said rocker arms to the neutral position, plungers slidably mounted in said block and movable to move said rocker arms to various operative positions, a rotary selector for selectively actuating said plungers, a lever on the steering column, movable about the axis of the steering column, for turning said selector, a constantly rotating shaft, means for intermittently moving said block, a clutch for operatively connecting said means to said shaft and means operable by depressing said lever for operating said last named clutch.

GARRETT W. WOODWARD.